Figure 1:
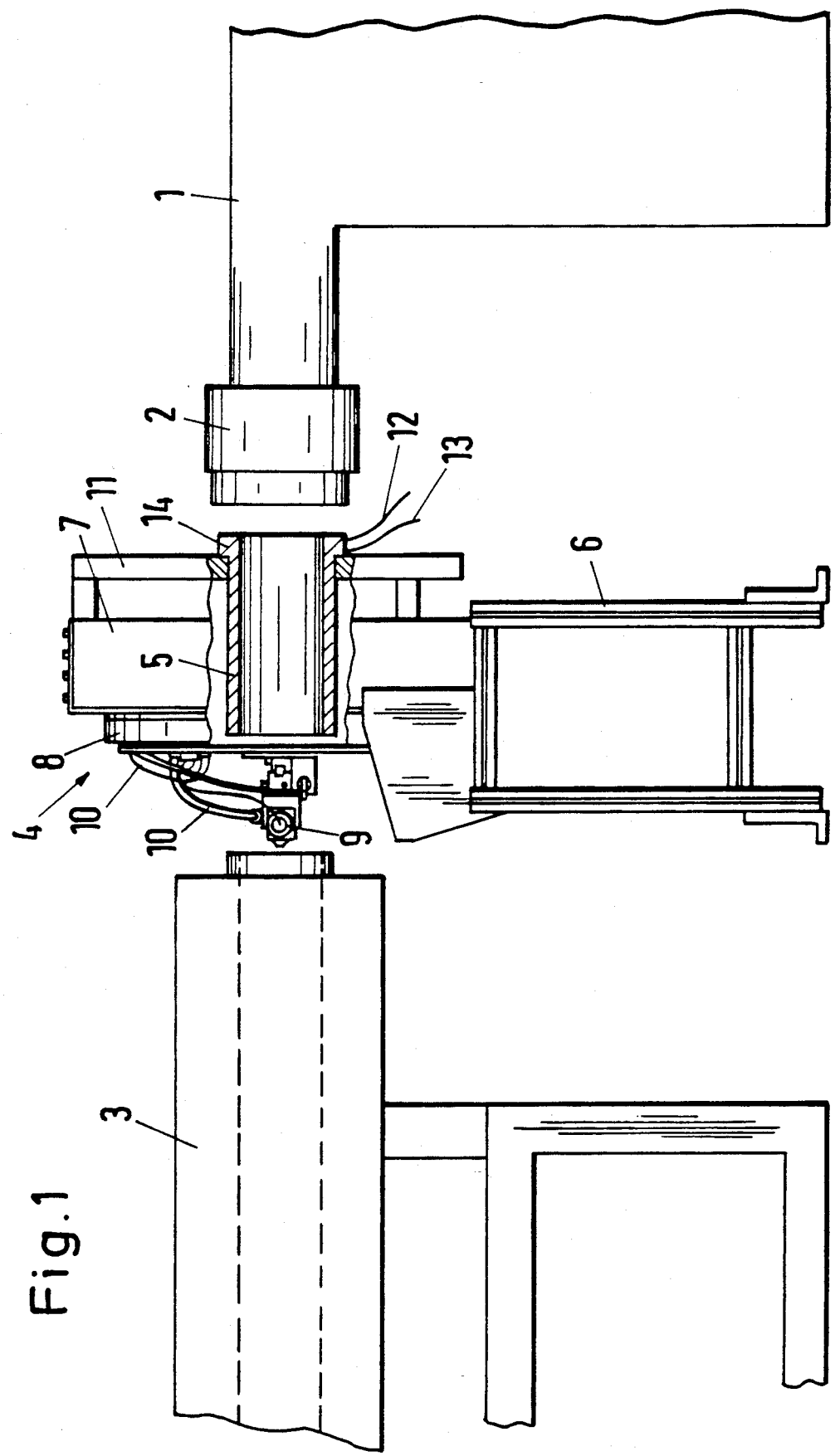

United States Patent [19]

Neumann, Ulrich

[11] Patent Number: 5,085,567
[45] Date of Patent: Feb. 4, 1992

[54] EXTRUSION SYSTEM FOR PLASTICS PIPES

[75] Inventor: Neumann, Ulrich, Bad Oeynhauser, Fed. Rep. of Germany

[73] Assignee: INOEX GmbH Innovationen und Ausrügstungen fur die Extrusiontechnik, Bad Oeyhausen, Fed. Rep. of Germany

[21] Appl. No.: 485,160

[22] Filed: Feb. 26, 1990

[30] Foreign Application Priority Data

Mar. 1, 1989 [DE] Fed. Rep. of Germany ....... 3906363

[51] Int. Cl.⁵ ............................................. B29C 47/90
[52] U.S. Cl. ........................................ 425/71; 73/622; 264/23; 264/40.6; 264/211.13; 425/141; 425/174.2
[58] Field of Search ....................... 425/67, 68, 70, 71, 425/72.1, 73, 85, 141, 143, 145, 377, 378.1, 379.1, 380, 174.2; 73/622; 264/23, 40.6, 211.13

[56] References Cited

U.S. PATENT DOCUMENTS

| | | | |
|---|---|---|---|
| 3,655,846 | 4/1972 | Kanoh et al. | 425/71 |
| 3,907,961 | 9/1975 | Carrow | 425/71 |
| 3,922,328 | 11/1975 | Johnson | 425/141 |
| 4,052,887 | 10/1977 | Sheridan et al. | 73/622 |
| 4,663,107 | 5/1987 | Takada et al. | 425/71 |
| 4,740,146 | 4/1988 | Angelbeck | 425/71 |
| 4,749,531 | 6/1988 | Böger et al. | 425/141 |

FOREIGN PATENT DOCUMENTS

| | | | |
|---|---|---|---|
| 2239747 | 2/1974 | Fed. Rep. of Germany . | |
| 3806301 | 1/1989 | Fed. Rep. of Germany . | |
| 674926 | 7/1979 | U.S.S.R. | 425/141 |
| 1282908 | 7/1972 | United Kingdom . | |
| 1370946 | 10/1974 | United Kingdom | 73/622 |

OTHER PUBLICATIONS

Ulrich Neumann, "There is Still Scope for Energy Savings in Plastics Division", MM Maschinenmarkt, Wurzburg, No. 51-Jun. 24, 1980, pp. 1002 et seq.
Brochure entitled "Scanner SC88", Inoex GmbH, 52.0.
Brochure entitled "Aurex 88R", Inoex GmbH, 49.0.

Primary Examiner—James C. Housel
Attorney, Agent, or Firm—Marmorek, Guttman & Rubenstein

[57] ABSTRACT

A device for producing hollow plastic pipes having a predetermined wall thickness, includes an extruder for producing soft hollow plastic tubing from a raw material, a continuous cooling chamber disposed downstream of the extruder for hardening the soft hollow tubing into the desired plastic pipes after the wall thickness of the plastic tubing has been calibrated, an independent water cooled calibrating sleeve disposed between the extruder and the cooling chamber which adjusts the wall thickness of the soft hollow plastic tubing, the water cooled calibrating sleeve being separated from the extruder and the cooling chamber, and a thickness measuring device disposed in the gap between the calibrating sleeve and the cooling chamber. The calibrating sleeve has an inner wall in which are arranged water inlets and suction orifices distributed along the circumference and the length of the inner wall. The water inlets lubricate the inner wall while the suction orifices draw the wall of the hollow plastic tubing to the desired wall thickness. In a preferred embodiment, the inner wall includes helically running channels for the supply of water and vacuum to the calibrating sleeve.

3 Claims, 2 Drawing Sheets

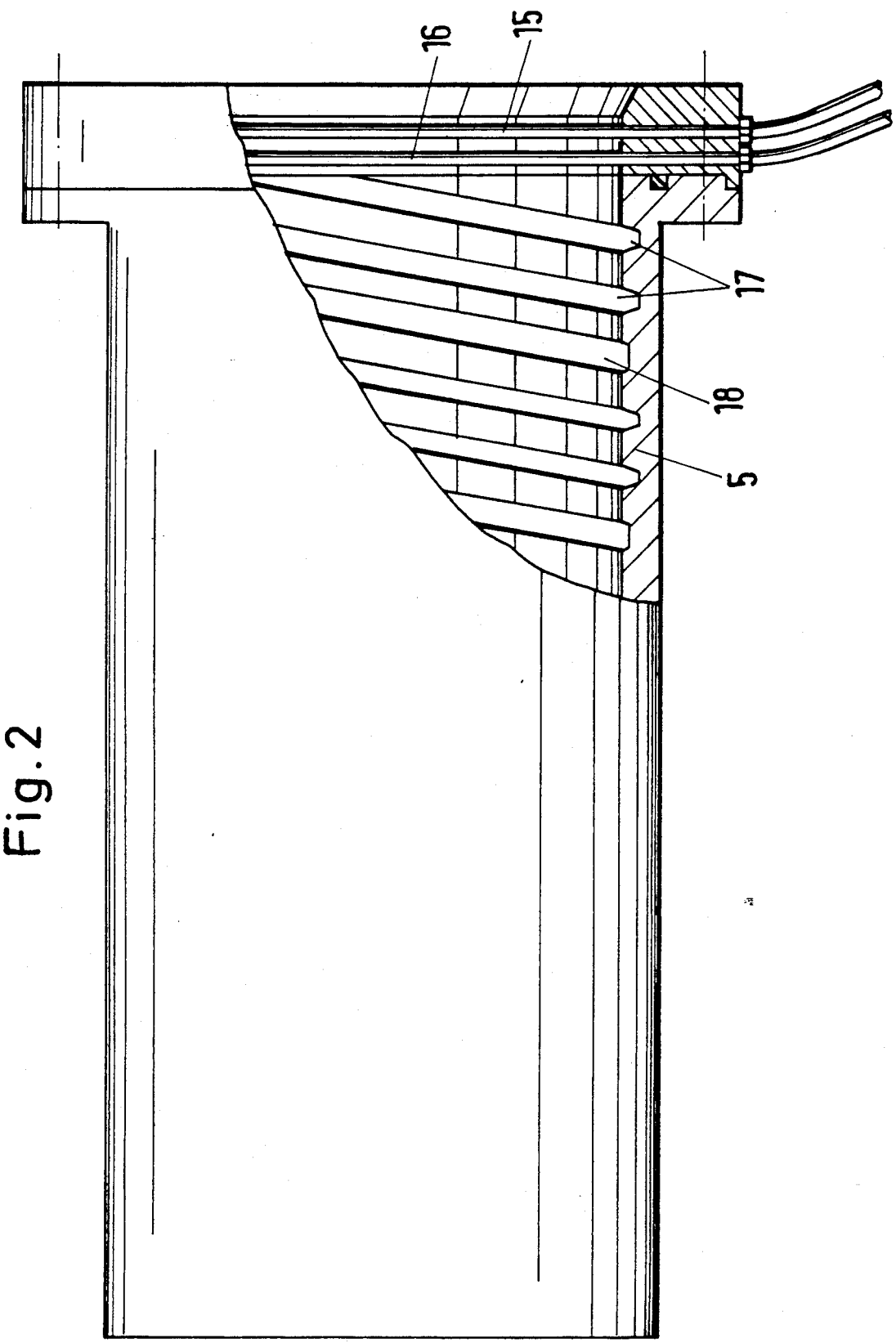

EXTRUSION SYSTEM FOR PLASTICS PIPES

The invention relates to an extrusion system for plastics pipes, consisting of an extruder, a water-cooled calibrating sleeve, a continuous cooling chamber for extruded pipes and a wall thickness measuring device having a passage.

In a known extrusion system of this type, the continuous cooling chamber, which is under a vacuum, is directly downstream of the extruder The calibration of the pipe is performed by means of the water-cooled calibrating sleeve, which forms with a water-cooled head the inlet of the cooling chamber and extends into the cooling chamber with its sleeve-shaped adjoining part. The sleeve-shaped part has a multiplicity of slits, offset with respect to one another in the circumferential direction and in the axial direction. Via these slits, on the one hand the vacuum of the continuous cooling chamber is supplied to the outside of the extruded pipe, whereby it is sucked against the inside of the wall of the calibrating sleeve, and on the other hand water is fed via these slits from spray nozzles to the surface of the extruded pipe This wet calibration has in practice established itself over a dry calibration because the water acts like a lubricant between the extruded pipe and the inside of the wall of the sleeve The wall thickness measurement of the calibrated pipe, made dimensionally stable by the cooling in the continuous cooling chamber, takes place in the wall thickness measuring device downstream of the cooling chamber, which measuring device is equipped with a centering device and a measuring head which runs around the pipe and operates on the ultrasonic measuring principle (MM Maschinenmarkt, Würzburg, No. 51—June 24, 1980, page 1002 et seq "Energieeinsparungen sind bei der Kunststoffextrusion noch immer möglich" (energy savings are still possible in plastics extrusion) by Ulrich Neumann; Brochures of Messrs Inoex Aurex 88 R, 49.0.04/88 D and "Scanner SC 88, 52.0 .04/88 D"; DE 38 06 301 C1).

A disadvantage of this prior art is that the continuous cooling chamber has to be designed with a large volume to accommodate the calibrating sleeve. Another disadvantage is that the wall thickness measurement is not possible on the pipe until it has been made dimensionally stable by the cooling of the continuous cooling chamber. If there are different temperatures over the circumference due to uneven cooling and/or differences in thickness, measuring errors occur with the wall thickness measuring device operating on the ultrasonic measuring principle. Another disadvantage of this late measurement is that wall thickness deviations exceeding the tolerance range cannot be determined fast enough and a correction carried out on the extruder.

Furthermore, a calibration system is known in which a calibrating sleeve arranged at the inlet of the continuous cooling chamber is sealed from the outside and has channels for cooling water and suction orifices, so that the pipe to be calibrated is sucked against the inside of the cooled wall (DT 22 39 747 A1). A similar calibrating device may also be arranged upstream of the continuous cooling chamber (GB PS 12 82 908).

The invention is based on the object of providing an extrusion system in which the calibration of the extruded plastics pipes is improved in comparison with the prior art with a small expenditure on equipment.

This object is achieved according to the invention with an extrusion system of the type mentioned at the beginning by the wall thickness measuring device being arranged between the extruder and the cooling chamber and receiving in its passage the calibrating sleeve, which is provided on its inner wall side with inlets for water and suction orifices, distributed over the circumference and the length.

In the extrusion system according to the invention, the advantages of wet vacuum calibration are preserved without requiring a voluminous continuous cooling chamber. In addition, the wall thickness measurement is performed directly after the calibration and close to the extruder, so that corrective interventions can be made at the extruder die very early if measured values lie outside the tolerance range Measuring errors due to different temperatures around the circumference are virtually ruled out because, unlike the cooling in the continuous chamber by spraying on water by means of the spray nozzles, in the cooling in the calibrating sleeve an absolutely even cooling over the circumference is ensured. Furthermore, the cooling time is so short that any temperature differences due to cooling do not falsify the measured values.

According to a development of the invention, the distribution of inlets for water and suction orifices may be realized in such a way that the inlets for water and the suction orifices are designed as helically running channels. In this development of the invention, a plurality of connections for water supply and water removal as well as for the suction orifices may be provided over the length of the sleeve in order to control the cooling effect and not to allow a drop in the vacuum.

According to a further development, the calibrating sleeve is designed as a centering device for a measuring head of the wall thickness measuring device, which head runs around the pipe to be measured Additional centering means, such as for example centering rollers, are consequently not needed.

The invention is explained in further detail below with reference to a drawing which represents an illustrative embodiment and in which:

FIG. 1 shows an extrusion system with extruder, continuous cooling chamber and wall thickness measuring device arranged in between and with a calibrating sleeve, in diagrammatic representation in side view and FIG. 2 shows a calibrating sleeve of the extrusion system of FIG. 1 in side view and partially in section in an enlarged representation.

According to FIG. 1, a wall thickness measuring device 4 with a calibrating sleeve 5, fastened rigidly in the passage of the latter, is arranged between an extruder 1 with an extruder die 2 for pipes and a continuous cooling chamber 3, which is under a vacuum and is equipped with spray nozzles (not shown) for water directed at the pipe running through. The wall thickness measuring device is known per se (DE 38 06 301 C1). A frame 7, which bears on its side facing the continuous cooling chamber 3 a hollow-cylindrical box 8, which serves as guide for a reversibly circulating measuring head 9 and the drive of the latter as well as for measuring and supply lines 10 leading to the measuring head 9, is arranged on a supporting structure 6. This measuring head 9, operating on the ultrasonic principle, serves to sense the wall thickness of the extruded pipe.

The frame 7 bears on the side facing the extruder die 2 a mounting frame 11, to which the calibrating sleeve 5 is fastened. Supply lines 12, 13 for water and vacuum, which lines are indicated in the drawing, lead to the said calibrating sleeve 5.

These two supply lines 12, 13 are connected to the flange 14 of the calibrating sleeve 5 and open out into annular channels 15, 16 on the inside of the flange 14 From these annular channels 15, 16, designed as open grooves, there extend helically running channels. Thus, from the water-carrying annular channel 15 there extends a double-lead channel 17 and from the annular channel 16 under the vacuum there extends a channel 18 lying between the double-lead channel 17. The vacuum applied to the channels 16, 18 has the effect of drawing the extruded pipe located in the calibrating sleeve 5 against the inside of the calibrating sleeve 5, whereby it is calibrated to the desired dimension. The water flowing in the channels 15, 17 has the effect of cooling the pipe and lubricating it with respect to the inside of the calibrating sleeve 5. The pipe leaving the calibrating sleeve 5 then has an even temperature over the circumference and an adequate dimensional stability to allow it to be measured with respect to its wall thickness by the measuring head 9 with the exclusion of measuring errors caused by temperature. In the event that differences in the wall thickness are determined, a fast response can be made by setting at the extruder die 2. Consequently, long pipes with incorrect wall thickness can no longer occur.

What is claimed is:

1. Device for producing hollow plastic pipes having a predetermined wall thickness, comprising extruding means for producing soft hollow plastic tubing having a wall thickness from a raw material, cooling means disposed downstream of said extruding means for hardening said tubing into said plastic pipes after the wall thickness of said plastic tubing has been calibrated, independent calibrating sleeve means disposed between said extruding means and said cooling means for adjusting the wall thickness of said tubing, said calibrating sleeve means being separated from said extruding means and said cooling means, said calibrating sleeve means including an inner wall defining a central passage for receiving said tubing, said calibrating sleeve means having a first channel means distributed along said inner wall for applying a liquid directly to said tubing for lubricating the tubing with respect to said inner wall and for cooling said tubing and a second channel means distributed along said inner wall which is spatially separate from but interleaved with said first channel means for applying a vacuum to said tubing to drawn the tubing against said inner wall simultaneously with said cooling and lubricating for enabling said tubing to leave said calibrating sleeve with a uniform temperature and with adequate dimensional stability to enable it to be measured with respect to its thickness, said first and second channel means being open to said central passage and measuring means disposed in a gap between said calibrating sleeve means and said cooling means for measuring the thickness of the wall of said tubing after it has passed through said calibrating sleeve means.

2. The device of claim 1 wherein said first and second channel means comprise helically running channels.

3. The device of claim 1 or 2 wherein said measuring means comprises a measuring head and said calibrating sleeve means comprises a centering device mounted on said measuring head.

* * * * *